3,113,870
CONTINUOUS PROCESS FOR THE PREPARATION
OF SMOKED SAUSAGE PRODUCTS
Hugh W. Barnett, Clarkson, Ontario, and William Tom
Force, Willowdale, Ontario, Canada, assignors to Canada Packers Limited, Toronto, Ontario, Canada
No Drawing. Filed May 8, 1961, Ser. No. 108,296
4 Claims. (Cl. 99—109)

This invention relates to a continuous process for the preparation of smoked sausage products, and particularly to the production of sausage products of the wiener type which are smoked in casings and then peeled to produce a skinless product.

In our U.S. Patent No. 2,973,277, granted Feb. 28, 1961, there is disclosed a continuous high temperature process and apparatus for the smoking of sausage products and whole meat cuts. This process as related to the production of wieners comprises placing linked strands of the wieners on the hooks of a traveling conveyor in the form of a series of successive loops, the wieners remaining in an unbroken string and the conveyor moving the looped strands along a continuous path through the processing apparatus. No breaking and tying of the strands, as in stick loading for conventional batch type smoking, is required in the continuous process. This not only results in labor savings, but provides a considerable saving in product material, since the end product of each stick in the batch process tends to shrivel and must often be discarded. The linked strands of wieners are conveyed continuously through successive smoking, steaming, and chilling zones, entering the system through a narrow opening in the wall of the smoking chamber, passing through such chamber, through a similar opening in the opposite wall of the chamber, through a chamber equipped with steam jets constituting the steaming zone, then through a chamber equipped with cold water sprays, chilling coils, or the like, constituting the chilling zone. Unprocessed wieners enter the system at one end while processed wieners on the same strand emerge at the other end. In the smoking zone the wieners are subjected directly to an atmosphere of dense smoke at a temperature above about 200° F. Optionally, the steaming zone may be omitted. The rate of travel of the wieners through the smoking zone is so correlated with the length of the path of travel through such zone that the wieners remain in the smoking zone for a period of time of less than about one-half hour, and preferably for a period of time within the range of approximately 10 to 30 minutes. Where a subsequent steaming operation is employed, the residence time in the smoking chamber may be slightly less than where steaming is eliminated. The rate of travel in the steaming zone is so correlated with the length of the path of travel that the wieners remain in such cooking zone for a relatively short period of time, less than one-half hour, and usually no longer than approximately 5 to 10 minutes. The temperature maintained in the steaming zone is advantageously in the range of from about 150° to 180° F. The internal temperature of the product during the smoking, or smoking and steaming operations should reach at least about 150° F., the time of processing being adjusted accordingly. Conditions in the chilling zone are adjusted so that the products are chilled to a packaging temperature, below say 60° F., within approximately 10 minutes. Most products may be readily chilled to such temperature within about 5 to 10 minutes, but longer chilling periods may be used if desired.

The above-described process reduces processing time for wiener smoking from about three hours, as previously employed in batch operations, down to about one-half hour or less. The quality of the product is good, processing shrink small, and large savings in labor and in plant space are realized. In general, the process is excellent. However, in some instances, difficulties are encountered in peeling the casings from the smoked product to produce wieners of the skinless type. The amount of scrap due to tearing of the wieners by the peeling machine or other damage during peeling may be higher than desirable. Of course, no problem exists with products of the type that are to be marketed without peeling. Special formulations of the wiener emulsions and/or special casings may also eliminate peeling problems.

It has now been found that the continuous wiener process may be operated at lower temperatures, utilizing standard wiener emulsions and conventional casings, with reduction in peeling difficulties while still effecting considerable savings in processing time and in labor, with respect to the conventional batch process, by properly correlating conditions of time, temperature and relative humidity within the smoking chamber.

It is an object of the present invention, therefore, to provide a continuous wiener process which will provide a product of high quality and reduce peeling problems.

The process, in general, comprises moving looped strands of wieners in casings in a continuous path through an atmosphere of dense smoke in a smokehouse to provide a residence time in said smokehouse of approximately 25 to 35 minutes, while the dry bulb temperature in said smokehouse is maintained at a selected temperature between approximately 165° to 200° F. and the wet bulb temperature at a selected temperature between approximately 115° F. and 140° F., the selected wet and dry bulb temperatures providing a relative humidity below 30%. Preferably, the relative humidity is maintained as low as will be possible consistent with the provision of a product of satisfactory peeling, texture and keeping properties for the particular formulation used to prepare the emulsion. In general, with the usual formulations of the packing plant, a relative humidity of about 15 to 30% has been found to produce a satisfactory product.

It will also be understood that in plant production the nature of the meat being ground to produce the wiener formulation is subject to some variations from day to day. Such variations may have some effect upon the amount of rendering during the smoking operation and upon the peelability of the product. It has been found that increasing the wet bulb temperature tends to improve peelability, but at the expense of increased rendering of fat or liquid from the wiener. Decreasing the wet bulb temperature tends to reduce rendering, if this is a problem, but may increase peeling difficulties. Keeping properties of the product are improved by the use of low wet bulb temperatures. It is possible, however, to raise or lower the wet bulb temperature within the 100° to 140° F. limits specified so as to best suit the product being processed at the time and to attain by such adjustment a condition that is satisfactory both from a rendering, storage, and peeling standpoint. Desirably, for best keeping properties, the wet bulb temperature is kept below about 130° F. and in the range of about 110° to 130° F.

It will also be understood that the processing time in the smoking chamber may be subject to considerable variation within the limits specified. With lower dry bulb temperature, longer smoking periods are employed. In general, the higher dry bulb temperatures provide a dryer product with longer keeping time. However, should peeling losses rise, the dry bulb temperature may be reduced and time of smoking increased.

The steaming zone may employ a dry bulb temperature of from 150° to 200° F., and time in this zone may range from 10 to 30 minutes, but usually no more than 20 minutes are necessary. The combined smoking and steaming operations are sufficient to raise the internal temperature of the product to about 150° F.

The time in the chilling zone may range from about 5 to 30 minutes, short chilling times in general being preferred.

The invention will be further illustrated by the following examples of practice. In these examples, a conventional wiener emulsion encased in conventional synthetic casings of regenerated cellulose was used. Strands of these wieners from the stuffers were run through a continuous smokehouse of the type described in the aforementioned Patent No. 2,973,277, but under the conditions given below in the examples.

*Example I*

| | |
|---|---|
| House dry bulb temperature °F__ | 165 |
| House wet bulb temperature °F__ | 115 |
| Steamer dry bulb temperature °F__ | 173 |
| Time in smoke minutes__ | 33 |
| Time in steam do____ | 17 |
| Time in chill do____ | 10 |

Under these conditions, the product had an acceptable peelability, averaging about 89.5%. The amount of scrap on peeling was low, averaging about 1.1%. Processing shrink was approximately 5% (much lower than that encountered in conventional batch processes), and the capacity of the house was approximately 1450 pounds per hour. The average keeping time of the product at 50–55° F. was approximately 10 days. No difficulties were encountered with rendering.

*Example II*

| | |
|---|---|
| House dry bulb temperature °F__ | 180 |
| House wet bulb temperature °F__ | 125 |
| Steamer dry bulb temperature °F__ | 180 |
| Time in smoke minutes__ | 28 |
| Time in steam do____ | 15 |
| Time in chill do____ | 9 |

Under these conditions, a house capacity of about 1700 pounds per hour was realized. The product had an acceptable keeping time (8 to 10 days at 50 to 55° F.), an acceptable shrink (around 5%), acceptable peelability (about 90%), and relatively low amount of scrap (2 to 3%).

*Example III*

| | |
|---|---|
| House dry bulb temperature °F__ | 195 |
| House wet bulb temperature °F__ | 140 |
| Steamer dry bulb temperature °F__ | 190 |
| Time in smoke minutes__ | 25 |
| Time in steam do____ | 15 |
| Time in chill do____ | 22 |

The production capacity under these conditions was about 2000 pounds per hour. The processing shrink averaged about 5%. Peelability was somewhat variable, depending upon variations in the formulation, but averaged 88 to 90%. The amount of scrap averaged around 3%. The shelf life of the product was slightly lower than that of the products obtained from Examples I and II. Rendering was slightly greater than under the conditions of Examples I and II, but was generally less than from wieners processed by conventional batch methods.

The term "peelability" as used above refers to the percentage of wieners peeled by the peeling machine. For example, if 100 wieners are put through the peeling machine and 12 of them are left with the skins on, the peelability is 88%. The unpeeled wieners do not represent product loss unless they have been otherwise damaged. The term "scrap" refers to wieners that may have been torn or nicked in the peeling process. Thus, if out of 100 wieners put through the peeling machine 3 have been damaged, the scrap is 3%.

From the foregoing examples it will be noted that peeling is more critical at the higher dry bulb temperatures. Further, the lowering of the temperature and the use of a slightly longer smoking time produces a tougher skin on the wieners and a slightly longer keeping time. It will be understood that the operator may choose between the conditions as set forth in the foregoing examples to correlate plant capacity with product quality and peelability. If difficulties arise with peeling at the processing rate and temperatures being utilized, the wet bulb temperature may be increased or both dry bulb and wet bulb temperatures decreased and a slower processing rate utilized. For example, if under the conditions set forth in Examples II or III difficulties are encountered in peelability with the particular formulation being used at the time, the conditions can be changed to those of Example I until the difficulty clears up. The conditions can then be changed back toward those of Examples II or III and maintained constant under the latter conditions as long as no difficulties arise.

It will be understood that the foregoing description and examples have been given by way of illustration only, many variations within the conditions specified being readily apparent to those skilled in the art. The smoking process may be employed with advantage on sausage products of many different types, including those which are marketed without peeling as well as the skinless varieties.

We claim:

1. A process for the production of wieners having improved rendering and peeling properties comprising moving looped strands of wieners through a smoking zone containing an atmosphere of dense smoke to provide a residence time in said smoking zone of approximately 25 to 35 minutes, and maintaining in said smoking zone a dry bulb temperature between approximately 165° and 195° F. and a wet bulb temperature between approximately 100° and 140° F., the relative humidity in said zone being less than about 30%.

2. A process for the production of wieners comprising moving looped strands of wieners in casings through a smoking zone to provide a residence time in said smoking zone of approximately 25 to 35 minutes, maintaining the dry bulb temperature in said smoking zone at a selected temperature between approximately 165° and 195° F., and adjusting the wet bulb temperature to a value between approximately 110° and 140° F., said value being determined by the rendering characteristics and peelability of the product, the relative humidity in said zone being less than about 30% and at least initially the dry bulb temperature being approximately 180° F., the residence time approximately 28 minutes, and the wet bulb temperature approximately 125° F.

3. A process for the production of wieners comprising moving looped strands of wieners in casings through a smoking zone to provide a residence time in said smoking zone of approximately 28 minutes, maintaining the dry bulb temperature in said smoking zone at approximately 180° F., and varying the wet bulb temperature within the range of 110° and 130° F., depending on the rendering and peeling characteristics of the product, the wet bulb temperature being raised when more ready peelability is required and lowered when excessive rendering occurs, the relative humidity in said zone being less than about 30%.

4. A continuous process for the production of smoked sausage products having improved rendering and peeling properties comprising continuously feeding linked strands of casings stuffed with sausage ingredients in a series of successive loops through a smoking zone, a steaming zone and a chilling zone, adjusting the speed of movement of said products with respect to the path of travel through said smoking zone so as to maintain the said products in the smoking zone for a period of time of approximately 25 to 35 minutes while maintaining an atmosphere of dense smoke in said smoking zone at a dry bulb temperature of from 165° to 195° F. and a wet bulb temperature of from approximately 110° to 140° F., the relative humidity in said smoking zone being less than about 30%, maintaining the products in said steaming zone for a period of time of approximately 10 to 30 minutes and chilling said products with cold water in said chilling zone.

References Cited in the file of this patent

UNITED STATES PATENTS 2,973,277   Barnett et al. _____ Feb. 28, 1961